United States Patent Office 2,882,485
Patented Apr. 14, 1959

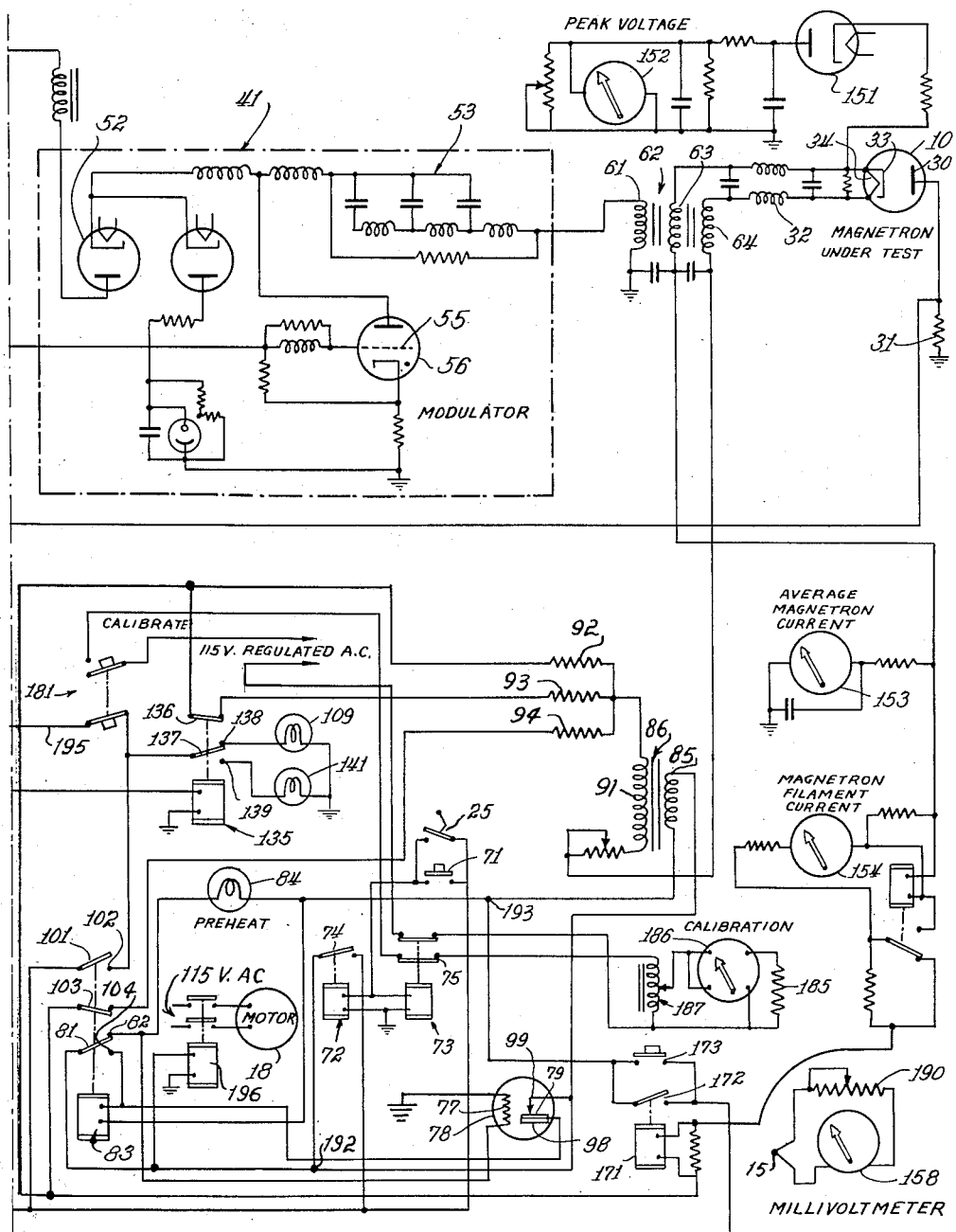

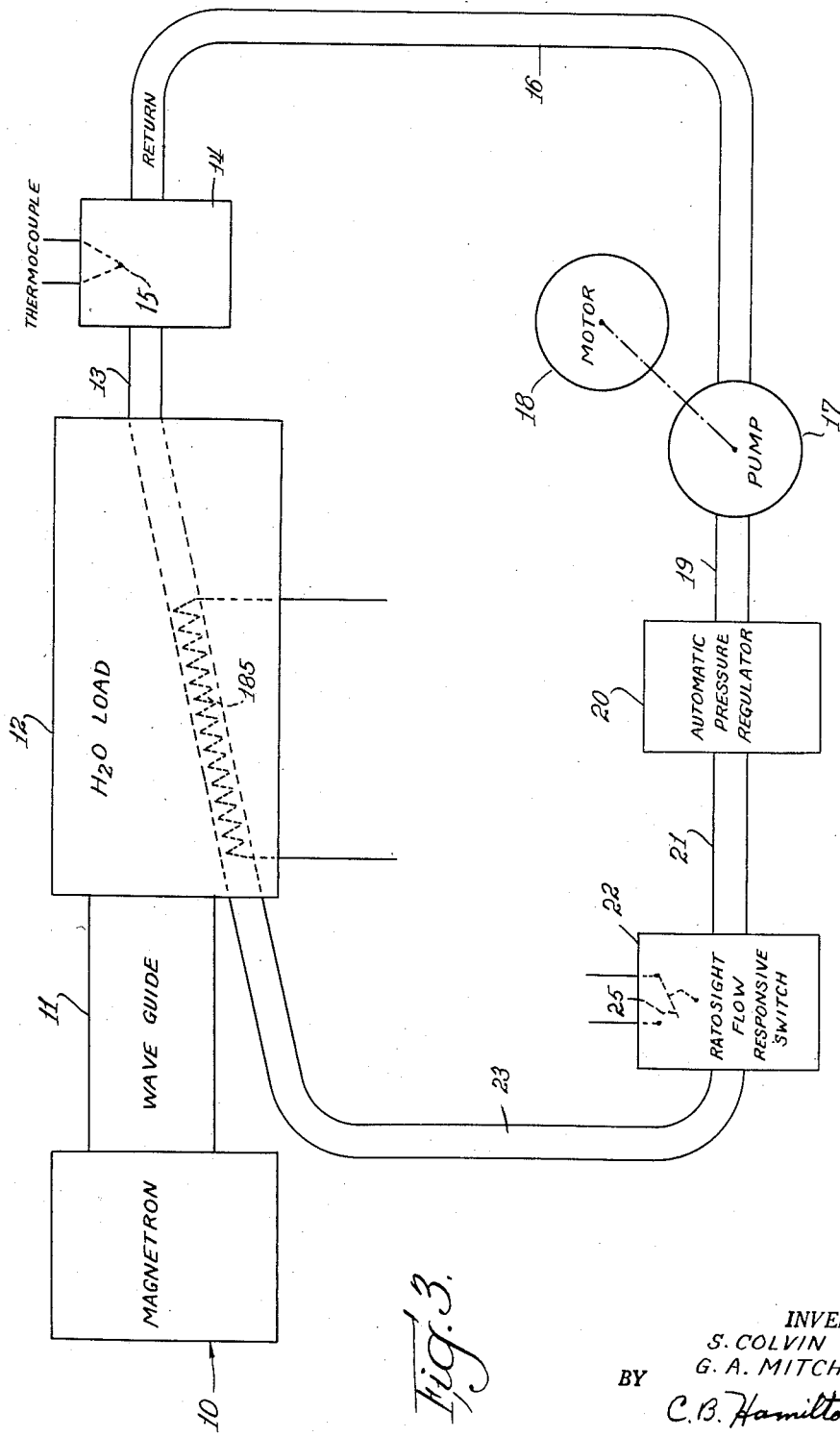

2,882,485

APPARATUS FOR ELECTRICALLY TESTING ELECTRON DISCHARGE DEVICES

Sion Colvin, Chicago, and Gerald A. Mitchell, Maywood, Ill., assignors to Western Electric Company, Incorporated, New York, N.Y., a corporation of New York Application July 15, 1953, Serial No. 368,183

5 Claims. (Cl. 324—26)

This invention relates to apparatus for electrically testing electron discharge devices, and more particularly to apparatus for testing magnetrons.

In the testing of electronic tubes such as magnetrons, it is often essential to warm up the tube filaments before applying high voltages in order to prevent damage. It is desirable to warm the tubes up as quickly as possible and to keep the tubes heated until the test thereon is made. It is also essential in testing the tubes that all components of the testing apparatus are operating satisfactorily before applying the test to the tubes. In the past, there has been no satisfactory apparatus for effecting these results.

A primary object of the invention is to provide new and improved apparatus for testing magnetrons.

Another object of the invention is to provide apparatus for heating up magnetrons to be tested, maintaining the magnetrons in a heated condition and then testing the magnetrons while they are heated.

A further object of the invention is to provide apparatus for operating a magnetron to generate high frequency waves, guiding the waves through a tube, flowing water through a portion of the tube to absorb the energy from the high frequency waves, and insuring that water is flowing before permitting operation of the magnetron.

An apparatus illustrating certain features of the invention may include means for applying a voltage to the filament of a magnetron of a predetermined value to rapidly heat the magnetron to an operable condition. This voltage is automatically lowered after the magnetron has been heated to such a condition and the magnetron is then tested under a high plate voltage. While the magnetron is tested, the high frequency waves generated thereby are directed along a wave guide within which a hollow tube is positioned for absorbing the energy from the magnetron. Water is circulated through the tube to absorb the energy from the high frequency waves, and the rise in temperature of water is detected to determine the energy output of the magnetron. Means may be provided for preventing the operation of the voltage applying means if the water is not flowing through the tube.

A complete understanding of the invention may be obtained from the following detailed description of an apparatus forming a specific embodiment thereof when read in conjunction with the appended drawings, in which:

Fig. 2 is a schematic view of the remaining portion of the circuit and may be matched with Fig. 1 by placing the left hand edge of Fig. 2 adjacent the right hand edge of Fig. 1, and Fig. 3 is a schematic representation of a dummy load used in testing a magnetron.

Figure 1:
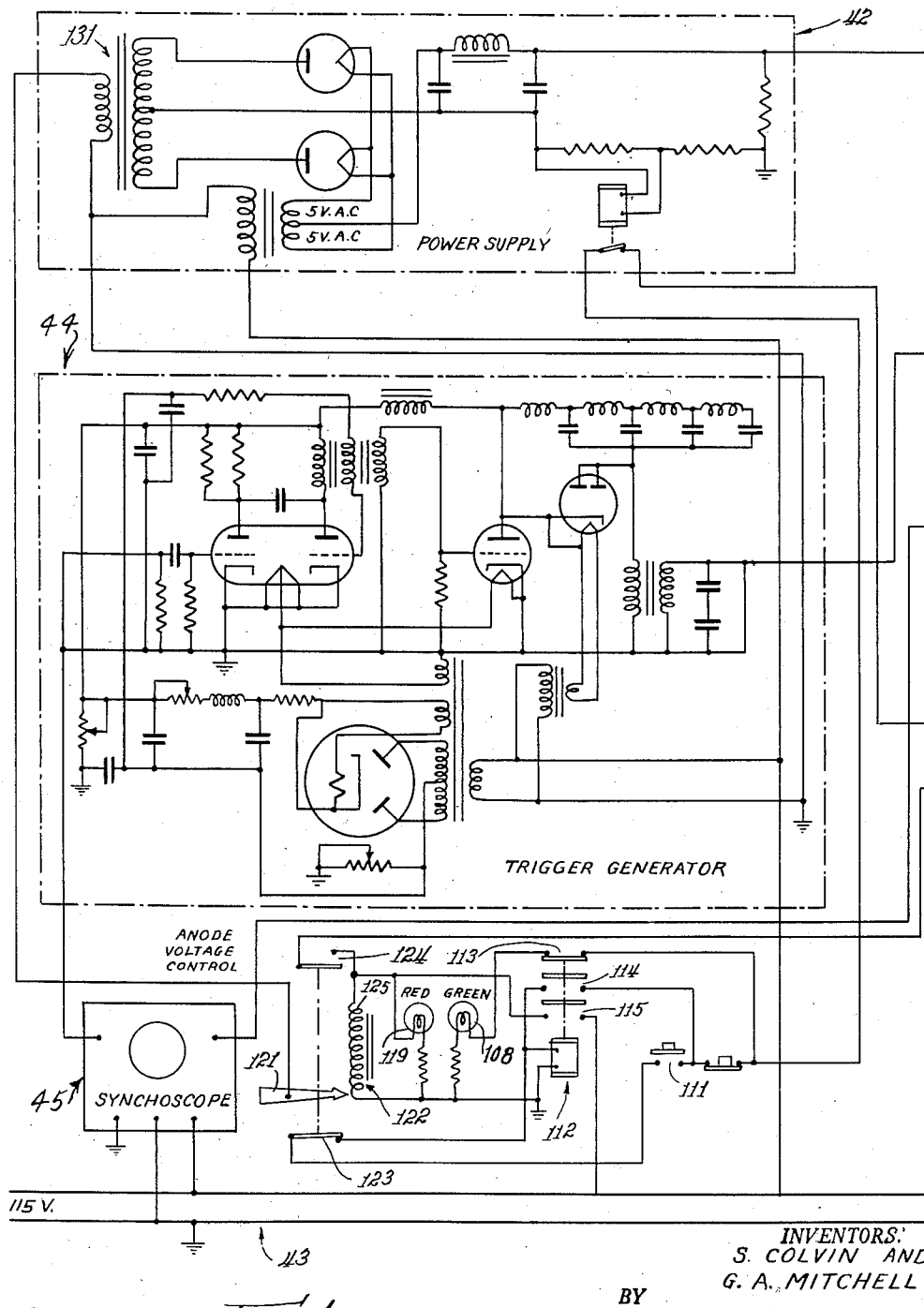
Fig. 1 is a schematic view of a portion of a circuit utilized in practicing the invention.

Referring now in detail to the drawings, there is shown therein an apparatus for testing the output of a magnetron 10 by causing it to direct high frequency waves through a wave guide 11 and a waterload wave guide 12 through which a tube 13 extends (Fig. 3). The tube 13 forms a portion of a closed hydraulic system which includes a conduit 14 into which a thermocouple 15 projects. A tube 16 connects the conduit 14 to an inlet of a pump 17 driven by a motor 18. The pump forces water therefrom through a tube 19, an automatic pressure regulator 20 of a well known type, a tube 21, a commercially available flow responsive mechanism 22 and a tube 23 to the tube 13. As the water flows through the regulator 20, it keeps the outlet pressure thereof constant, and the water flowing through the flow responsive mechanism 22 closes a switch 25. When there is not a predetermined flow of water through the mechanism 22, the mechanism opens the switch 25. The output of the magnetron 10 is determined by the extent to which the water flowing through the chamber 12 is heated when compared with the input power applied to the magnetron.

To test the magnetron 10, its plate 30 (Fig. 2) is connected to ground 31 on one side, and networks 32 are connected to a cathode 33 and a filament 34 thereof. Power is supplied to the magnetron through a conventional modulator 41 which is supplied with power from a well known type of power supply circuit 42 (Fig. 1) connected to a power line 43. The modulator 41 is pulsed by a conventional trigger generator 44 whose frequency is controlled by a standard synchroscope 45 which also is connected to the power line 43. The power source 42 continuously supplies power to the modulator 41 (Fig. 2) through a charging diode 52 charged by a network 53. The trigger generator 44 controls the voltage of a control grid 55 of a thyratron tube 56 to fire the tube 56 in synchronism with the frequency of the trigger generator; which frequency is controlled by the synchroscope 45 in a well known manner. Whenever the tube 56 is fired, the network 53 discharges current flowing through a primary winding 61 of a transformer 62 to generate high voltages in secondary windings 63 and 64 to apply a very high voltage to the magnetron 10.

After the magnetron is connected to the apparatus, a manually operable momentary switch 71 is closed to energize relays 72 and 73. The relay 72 closes contacts 74 thereof to energize relay 196 and start the pump motor 18. The pump 17 then forces water through the flow-responsive device 22 closing switch 25 which locks these relays in. The relay 73 opens contacts 75 to prevent calibration of the circuit at this time. Closure of the contacts 74 also closes a circuit across the power line 43 to a resistance heating element 77 of a commercially available thermal relay 78 having normally open contacts 79. This circuit is closed through the contacts 74, contacts 81 and 82 of a relay 83, and through the element 77 to ground. Current flow in this closed circuit starts the thermal relay 78 heating; the contacts 79 being open until the resistance heating element 77 reaches a predetermined temperature. This occurs a predetermined time after the voltage is applied to the resistance 77.

A switch 173 is next closed to energize an indicator lamp 84 and a transformer primary 85 which are in parallel with each other between the junctions 192 and 193. The resultant current flow in the primary winding 85 induces a voltage in a secondary winding 91 to cause current to flow through resistors 92, 93 and 94 which are connected in parallel with each other and in series with the filament 34 of the magnetron 10. This current flow in the filament circuit energizes a sensitive relay 171 which closes contacts 172 permitting release of the switch 173. The transformer 86 thus remains energized as long as relays 72 and 171 are energized. While the resistors 92, 93 and 94 are in parallel, a "preheat" voltage is applied to the filament 34 to heat the magnetron rapidly to an operable temperature. After the magnetron has reached a safely operable temperature, the time elapsed is sufficient that a bi-metallic element 98 of the relay 78 engages a contact 99 to apply voltage to and energize the relay 83, thereby moving a contact 101 into engagement with a contact 102 breaking the connection between contacts 103 and moving the contact 81 out of engagement with the contact 82 and into engagement with a holding contact 104. When the contacts 103 are broken, the resistor 94 is cut out of the circuit to the filament 34. This increases the resistance between the transformer 86 and the filament 34 to decrease the filament voltage substantially to a "standby" value from the higher "preheat" voltage. The indicating lamp 84 is darkened by the opening of contacts 81 and 82 to indicate that the magnetron has been warmed up and may be tested under high voltages. Opening of contacts 81 and 82 also de-energizes the thermal relay 78 permitting it to cool in preparation for the next test.

An operator then may close the switch 111 which energizes a relay 112 to break contacts 113 and make contacts 114 and 115. When the contacts 113 are broken, the lamp 108 goes out indicating that the circuit is no longer in standby condition. When the contacts 115 are made, an indicating lamp 119 is illuminated to indicate that a voltage has been applied across the variac 122 and the circuit has been conditioned for testing of the magnetron 10.

The operator then moves a contactor 121 of a variac 122 upwardly as viewed in Fig. 1 which opens contacts 123 and closes contacts 124. That is, the contacts 123 and 124 are physically connected to a manual controlling element of the variac 122 and the contacts 123 are not closed unless the total length of an inductor 125 of the variac is in series with a transformer 131 of the power supply 42 at the start of the test. This insures that minimum voltage will be applied to the magnetron anode at the start of the test. As soon as the contacts 124 are closed, a relay 135 is energized to open contacts 136 and remove the resistor 93 from the filament circuit. This further reduces the filament voltage from the "standby" value to the final operating voltage. The magnetron 10 then is pulsed by the synchroscope 45 through the generator 44 and the modulator 41. The voltage of the magnetron is transmitted through a diode 151 to a voltmeter 152 which measures peak voltages, and the average magnetron current is measured by an ammeter 153. The magnetron filament current is measured by an ammeter 154. The power output of the magnetron is measured by a millivoltmeter 158 connected to a thermocouple 15 mounted in the passage 14.

A manually operable toggle switch 181 is provided for setting up the circuit for calibrating the millivoltmeter 158 which is effected by means of a resistor 185, mounted in the tube 13, and a wattmeter 186 power is applied to the resistor 185, through the wattmeter 186, by means of a variac 187. The variac 187 is adjusted to provide a selected value to the wattmeter 186. The millivoltmeter 158 is read and a potentiometer 190 is adjusted, if necessary, to make the millivoltmeter indicate the same value as the wattmeter 186. The switch 181, when in its calibrating position, prevents application of high voltage to the magnetron 10 by opening line 195 to prevent energization of relay 112.

If the magnetron 10 is disconnected from the circuit, the relay 171 drops out opening the contacts 172 to de-energize the relay 83 and the transformer 86. The relay 72 remains energized so that another magnetron may be inserted and the preheating begun by closing the switch 173 without stopping the flow of water. If the water flowing through the system should fail for any reason, the switch 25 opens automatically to drop out the relay 72 thereby de-energizing relays 83 and 112. The relay 112 opens its contacts 115 cutting out power to the variac 122 and the magnetron 10. Thus, damage to the magnetron is prevented.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for electrically testing an electron discharge device comprising a source of low voltage, a filament heating circuit including the filament of said device and a variable impedance means which is normally at a minimum value, means for coupling said low voltage source to said heating circuit to apply a maximum filament voltage to said device, said maximum filament voltage being substantially higher than the normal operating filament voltage of said device, delay means actuated by said coupling means for increasing the effective value of said impedance means after a predetermined period of time to cause a reduction in the voltage drop across the filament of said device to a value equal to the normal operating filament voltage, a test circuit for applying a high voltage to the anode of said device to cause said device to function, means responsive to the delay means for coupling the test circuit to the anode of the device after the predetermined period of time has elapsed, load means for receiving and indicating the power output of said device, and means included in said load means responsive to abnormal operation of said load means for disabling said heating and test circuits.

2. In an apparatus for electrically testing a magnetron, a low voltage source, a filament heating circuit including the filament of said magnetron and a variable impedance means normally at its minimum value, means for coupling said low voltage source to the heating circuit to apply a maximum filament voltage to said magnetron, said maximum filament voltage being substantially higher than the normal operating filament voltage of said magnetron, time delay means actuated by said coupling means for increasing the effective value of said impedance means after a predetermined period of time to reduce the voltage applied to the filament of said magnetron to a value equal to the normal operating filament voltage of said magnetron, a test circuit for applying a high voltage to the plate of said magnetron to cause said magnetron to oscillate, means responsive to the time delay means for coupling said test circuit to the plate of said magnetron at the end of said predetermined period of time, a water load for receiving and absorbing the output of said magnetron, means for measuring the temperature rise of the water load to indicate the power output of said magnetron, and means responsive to improper functioning of said water load for de-energizing said heating and test circuits.

3. An apparatus for electrically testing a magnetron comprising a source of low voltage, a filament heating circuit including the filament of said magnetron and a variable impedance means which is normally at a minimum value, means for coupling the low voltage source to said heating circuit to apply a heating voltage to the filament of said magnetron, said heating voltage being substantially higher than the normal operating filament voltage of said magnetron, time delay means actuated by said coupling means for increasing the effective value of said impedance means after a predetermined period of time to cause a reduction in the voltage applied to the filament of said magnetron to a value equal to the normal operating filament voltage of said magnetron, a test circuit for applying a high voltage to the plate of said magnetron to cause said magnetron to oscillate, means responsive to the delay means for coupling the test circuit to the plate of said magnetron after the predetermined period of time has elapsed, a wave guide along which the output of the magnetron is transmitted, a closed fluid circuit connected to said wave guide for absorbing the power output of said magnetron, means for circulating a fluid within said fluid circuit, means for detecting a temperature rise in said fluid to indicate power output of said magnetron, and means included in said fluid circuit responsive to a cessation of water flow for disabling the testing and heating circuits.

4. An apparatus for testing magnetrons comprising a source of high voltage, a test circuit of low impedance for coupling the voltage source to electrodes of a magnetron to be tested, a water load system including an element for receiving the output of the magnetron, means for circulating water through the system, a normally open switch closable by flow of water through the system, a manually operable momentary switch in parallel with the normally open switch for connecting a variable impedance means between a filament of the magnetron and the voltage source and for actuating the water-circulating means to close the normally open switch in parallel therewith, said variable impedance means being normally of a first predetermined value such that said voltage source will apply a voltage across the filament of the magnetron which is substantially higher than the normal operating filament voltage, means for increasing the variable impedance means to a second predetermined value which is higher than said first predetermined value and such that a voltage is applied across said filament which is lower than the first applied voltage and higher than the normal operating filament voltage, time delay means actuated by the momentary switch and the normally open switch for actuating the increasing means a predetermined period of time after the time delay means is initially actuated, relay means operable when actuated for connecting the test circuit, the voltage source, and the magnetron in series, manually operable means for actuating the relay means, and means operable by the last-mentioned manually operable means for increasing the variable impedance means to a third predetermined value higher than said second predetermined value and such that the normal operating voltage will be applied to the filament of the magnetron.

5. An apparatus for testing magnetrons comprising a source of high voltage, a test circuit of low impedance for coupling the voltage source to the electrodes of the magnetrons to be tested, a calibrating circuit, means for selectively operating the calibrating circuit and the test circuit, a water load system including an element for receiving the output of the magnetron, means for circulating water through the system, a normally open switch closable by flow of water through the system, a manually operable momentary switch in parallel with the normally open switch for connecting a variable impedance means between the filament of the magnetron and the voltage source, said variable impedance means being normally of a first predetermined value such that the voltage source will apply a voltage across said filament which is substantially higher than the normal operating filament voltage, means operated by closure of said momentary switch for actuating the water-circulating means to close the normally open switch in parallel therewith, means for increasing the variable impedance means to a second predetermined value which is higher than said first predetermined value to apply to said filament a voltage which is lower than the first applied voltage and higher than the normal operating voltage, time delay means actuated by the momentary switch and the normally open switch for actuating the increasing means a predetermined period of time after the time delay means is initially actuated, relay means operable when actuated for connecting the test circuit, the voltage source, and the magnetron in series, manually operable means for actuating the relay means, and means operable by the last-mentioned manually operable means for increasing the variable impedance means to a third predetermined value higher than said second predetermined value and such that the normal operating voltage will be applied to the filament of the magnetron.

References Cited in the file of this patent
UNITED STATES PATENTS

| 1,916,364 | Du Mont | July 4, 1933 |
| 2,118,919 | Gannett | May 31, 1938 |
| 2,440,287 | Oravetz | Apr. 27, 1948 |
| 2,495,733 | Kandoian | Jan. 31, 1950 |
| 2,575,799 | Doherty et al. | Nov. 20, 1951 |

OTHER REFERENCES

"Tele-Tech," October 1952, pp. 36, 37, 110, 111.